United States Patent
Shao et al.

(10) Patent No.: US 8,920,985 B2
(45) Date of Patent: Dec. 30, 2014

(54) POWER GENERATION METHOD USING A FUEL CELL HAVING A STABILIZED CATHODE CATALYST

(71) Applicant: Ballard Power Systems Inc., Burnaby (CA)

(72) Inventors: Minhua Shao, Manchester, CT (US); Belabbes Merzougui, Dhahran (SA); Patrick L. Hagans, Dexter, MI (US); Susanne M. Opalka, Glastonbury, CT (US)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 13/783,820

(22) Filed: Mar. 4, 2013

(65) Prior Publication Data

US 2014/0080014 A1 Mar. 20, 2014

Related U.S. Application Data

(62) Division of application No. 12/867,162, filed as application No. PCT/US2008/006324 on May 16, 2008, now Pat. No. 8,389,175.

(51) Int. Cl.

| | |
|---|---|
| *H01M 8/00* | (2006.01) |
| *H01M 8/02* | (2006.01) |
| *H01M 8/06* | (2006.01) |
| *H01M 8/10* | (2006.01) |
| *B01J 23/00* | (2006.01) |

(Continued)

(52) U.S. Cl.
CPC .... *H01M 4/8647* (2013.01); *H01M 2008/1095* (2013.01); *H01M 8/1002* (2013.01); *H01M 8/086* (2013.01); *Y02E 60/521* (2013.01); *H01M 4/921* (2013.01); *Y10S 977/773* (2013.01); *Y10S 977/775* (2013.01)

USPC ........... 429/408; 429/400; 429/482; 429/524; 502/313; 502/326; 502/330; 502/334; 502/339; 502/344; 977/773; 977/775

(58) Field of Classification Search
USPC ................. 502/313, 326, 330, 334, 339, 344; 977/773, 775; 429/400, 482, 524, 408
See application file for complete search history.

(56) References Cited

U.S. PATENT DOCUMENTS

| | | |
|---|---|---|
| 4,559,364 A | 12/1985 | Wood et al. |
| 4,613,582 A | 9/1986 | Luczak et al. |

(Continued)

FOREIGN PATENT DOCUMENTS

| | | |
|---|---|---|
| DE | 4326938 A1 | 2/1995 |
| EP | 0225953 A1 | 6/1987 |

(Continued)

OTHER PUBLICATIONS

Official Search Report and Written Opinion of the in counterpart foreign Application No. PCT/US2008/006324, filed May 16, 2008.

(Continued)

*Primary Examiner* — Cam N. Nguyen
(74) *Attorney, Agent, or Firm* — Seed IP Law Group PLLC (57) ABSTRACT

A method of generating electrical power includes flowing hydrogen across an anode, splitting the hydrogen into protons and electrons using a catalyst attached to the anode, directing the electrons to a circuit to produce electrical power, flowing oxygen across a cathode, splitting the oxygen molecules into oxygen atoms using a cathode catalyst, passing the protons through an electrolyte to the cathode, and combining the protons with oxygen to form water. The cathode catalyst includes a plurality of nanoparticles having terraces formed of platinum, and corner regions and edge regions formed of a second metal.

17 Claims, 9 Drawing Sheets

(51) Int. Cl.

| | | |
|---|---|---|
| *B01J 23/02* | (2006.01) | |
| *B01J 23/04* | (2006.01) | |
| *B01J 23/40* | (2006.01) | |
| *B01J 23/42* | (2006.01) | |
| *B01J 23/44* | (2006.01) | |
| *B01J 23/58* | (2006.01) | |
| *H01M 8/08* | (2006.01) | |
| *H01M 4/86* | (2006.01) | |
| *H01M 4/92* | (2006.01) | |

(56) References Cited

U.S. PATENT DOCUMENTS

| | | | |
|---|---|---|---|
| 5,049,206 A | 9/1991 | Usui et al. | |
| 5,179,054 A | 1/1993 | Schipper et al. | |
| 5,759,944 A | 6/1998 | Buchanan et al. | |
| 5,763,351 A | 6/1998 | Ichimura | |
| 6,090,858 A | 7/2000 | El-Sayed | |
| 6,140,266 A | 10/2000 | Corrigan et al. | |
| 6,783,569 B2 | 8/2004 | Cheon et al. | |
| 6,855,453 B2 | 2/2005 | Bett et al. | |
| 6,858,337 B2 | 2/2005 | Reiser | |
| 7,135,055 B2 | 11/2006 | Mirkin et al. | |
| 7,144,627 B2* | 12/2006 | Halas et al. | 428/403 |
| 7,147,687 B2 | 12/2006 | Mirkin et al. | |
| 7,205,255 B2 | 4/2007 | Yamamoto | |
| 7,208,439 B2 | 4/2007 | Zhong et al. | |
| 7,238,472 B2* | 7/2007 | Mirkin et al. | 435/6.1 |
| 7,318,977 B2 | 1/2008 | He et al. | |
| 7,449,237 B2* | 11/2008 | Chan et al. | 428/403 |
| 7,507,495 B2* | 3/2009 | Wang et al. | 429/423 |
| 7,538,062 B1* | 5/2009 | Dai et al. | 502/185 |
| 7,595,108 B2* | 9/2009 | Perez et al. | 428/403 |
| 7,691,780 B2* | 4/2010 | Adzic et al. | 502/339 |
| 7,704,918 B2* | 4/2010 | Adzic et al. | 502/327 |
| 7,704,919 B2* | 4/2010 | Adzic et al. | 502/344 |
| 7,727,931 B2* | 6/2010 | Brey et al. | 502/344 |
| 7,771,624 B2* | 8/2010 | Shim et al. | 252/512 |
| 7,799,425 B2* | 9/2010 | Chikamori et al. | 428/403 |
| 7,803,498 B2* | 9/2010 | Dressick et al. | 429/524 |
| 7,820,291 B2* | 10/2010 | Kim et al. | 428/403 |
| 7,820,585 B2* | 10/2010 | Hirata | 502/261 |
| 7,935,655 B2* | 5/2011 | Tolmachev | 502/326 |
| 7,955,755 B2* | 6/2011 | Mcgrath et al. | 429/524 |
| 7,960,025 B2* | 6/2011 | Fernandez Camacho et al. | 428/403 |
| 8,022,006 B2* | 9/2011 | Dressick et al. | 502/150 |
| 8,048,548 B2* | 11/2011 | Adzic et al. | 429/524 |
| 2002/0197404 A1 | 12/2002 | Lee et al. | |
| 2006/0134505 A1 | 6/2006 | Wang et al. | |
| 2006/0135359 A1 | 6/2006 | Adzic et al. | |
| 2007/0026292 A1 | 2/2007 | Adzic et al. | |
| 2007/0105005 A1 | 5/2007 | Tolmachev | |
| 2007/0128439 A1* | 6/2007 | Kim et al. | 428/404 |
| 2007/0248862 A1* | 10/2007 | Park et al. | 429/30 |
| 2008/0044719 A1* | 2/2008 | Gorer et al. | 429/40 |
| 2008/0113257 A1* | 5/2008 | Hampden-Smith et al. | 429/42 |
| 2008/0124613 A1* | 5/2008 | Gur et al. | 429/44 |
| 2008/0166599 A1* | 7/2008 | Swathirajan et al. | 429/13 |

FOREIGN PATENT DOCUMENTS

| | | |
|---|---|---|
| EP | 1209695 A1 | 5/2002 |
| EP | 1604761 A1 | 12/2005 |
| GB | 706696 | 4/1954 |
| JP | 58146442 A | 9/1983 |
| WO | 9640425 A2 | 12/1996 |
| WO | 2006008384 A1 | 1/2006 |
| WO | 2006078352 A2 | 7/2006 |

OTHER PUBLICATIONS

K. Kinoshita, "Particle Size Effects for Oxygen Reduction on Highly Dispersed Platinum in Acid Electrolytes", from J. Electrochem. Soc., vol. 137, No. 3, Mar. 1990, pp. 845-848.

T.S. Ahmadi et al., "'Cubic' Colloidal Platinum Nanoparticles", from Chemistry of Materials, vol. 8, No. 6, Jun. 1996, pp. 1161-1163.

A. Crown et al., "Scanning Tunneling Microscopy Investigations of Ruthenium- and Osmium-Modified Pt(100) and Pt (110) Single Crystal Substrates", from Phys. Chem. Chem. Phys., 2001, pp. 3290-3296.

S.H. Bonilla et al., "Catalytic Effects of Ruthenium and Osmium Spontaneous Deposition on Platinum Surfaces Toward Methanol Oxidation", from Journal of Colloid and Interface Science 288, 2005, pp. 377-386.

J. Zhang et al., "Stabilization of Platinum Oxygen-Reduction Electrocatalysts Using Gold Clusters", from Science vol. 315, Jan. 12, 2007, pp. 220-222.

N. Markovic et al., "Kinetics of Oxygen Reduction on Pt(hkl) Electrodes: Implications for the Crystallite Size Effect with Supported Pt Electrocatalysts", from J. Electrochem. Soc., vol. 144, No. 5, May 1997, pp. 1591-1597.

"A Boost for Hydrogen Fuel Cell Research", from <http://www.physorg.com/news88953630.html>, Jan. 25, 2007, 1 page.

"Better Catalysts for Fuel Cells", from <http://www.technologyreview.com/Nanotech/18669/>, May 4, 2007, 3 pages.

K.H. Park, Abstract from "High Current Field Emission from Carbon Nanofiber Films Grown Using Electroplated Ni Catalyst", from J. Vac. Sci. Technol. B., Microelectron. Nanometer Struct., vol. 23, No. 2, Mar. 2005, pp. 776-780.

J. Zhang et al., Abstract from "Platinum Monolayer on Nonnoble Metal-Noble Metal Core-Shell Nanoparticle Electrocatalysts for O2 Reduction", from Journal of Physical Chemistry B, vol. 109, No. 48, Dec. 8, 2005, pp. 22701-227014.

A. F. Lee et al., Abstract from "Structural and Electronic Properties of Sn Overlayers and Pd/Sn Surface Alloys on Pd (111)", from Surface Science, vol. 373, No. 2-3, Mar. 1, 1997, pp. 195-209.

Jia-Wen Hu et al., Abstract from "Palladium-Coated Gold Nanoparticles With a Controlled Shell Thickness Used as Surface-Enhanced Raman Scattering Substrate", from Journal of Physical Chemistry C, vol. 111, No. 3, Jan. 25, 2007, pp. 1105-1112.

Y. Saito, Abstract from "Carbon Nanocapsules and Single-Layered Nanotubes Produced With Platinum-Group Metals (Ru, Rh, Pd, Os, Ir, Pt) by Arc Discharge", from J. Appl. Phys., vol. 80, No. 5, Sep. 1, 1996, pp. 3062-3067.

S. Didziulis et al., Abstract from "Chemistry of Copper Overlayers on Zinc Oxide Single-Crystal Surfaces: Model Active Sites for Cu/ZnO Methanol Synthesis Catalysts", from Journal of the American Chemical Society, vol. 111, No. 18, 1989, pp. 7110-7123.

L. Han et al., Abstract from "A Direct Route Toward Assembly of Nanoparticle-Carbon Nanotube Composite Materials", from Langmuir, Jul. 6, 2004, pp. 6019-6025.

A. A. Hummel et al., Abstract from "Surface and Bulk Changes in Iron Nitride Catalysts in H2/CO mixtures", from Journal of Catalysis, vol. 113, No. 1, Sep. 1988, pp. 236-249.

G. Liu et al., Abstract from "An XPS Study of the Interaction of Ultrathin Cu Films with Pd (III)", from Journal of Physical Chemistry B: Materials, Surfaces, Interfaces, amp Biophysical, vol. 103, No. 40, Oct. 7, 1999, pp. 8578-8582.

J. A. Rodriguez et al., Abstract from "Surface Science Studies of the Electronic and Chemical Properties of Bimetallic Systems", from Journal of Physical Chemistry, vol. 95, No. 11, May 30, 1991, pp. 4196-4206.

L. L. L Li et al. Abstract from "Electrooxidation of Methanol on upd-Ru and upd-Sn Modified Pt Electrodes", from Journal of Physical Chemistry B, vol. 110, No. 51, Dec. 28, 2006, pp. 20655-26061.

E. A. Carter et al., Abstract from "Adsorption of NOx and Cox on Pd and Pt Clusters", from the 1989 International Chemical Congress of Pacific Basin Societies: Abstracts of Papers, Parts I and II, American Chemical Society, 1989, p. 1287.

S. Anhock et al., Abstract from "Investigations of Au-Sn Alloys on Different End-Metallizations for High Temperature Applications Solders", from Twenty Second IEEE/CPMT Int'l Electronics Mfg. Tech. Symposium. IEMT-Europe 1998. Electronics Mfg. And Development for Automotives, 1998, pp. 156-165.

(56) References Cited

OTHER PUBLICATIONS

T. He et al., Abstract from "Ternary Alloy Nanoparticles with Controllable Sizes and Composition and Electrocatalytic Activity", from Journal of Materials Chemistry, 2006, pp. 1665-1673.

G. Garzel et al., Abstract from "Electromotive Force Measurements in Liquid Ag-In-Pd Lead-Free Alloys", from Rare Metals (English Edition), vol. 25, No. 5, Oct. 2006, pp. 587-591.

A Crown et al., Abstract from "Research Toward Designing High Activity Catalysts for Fuel Cells: Structure and Reactivity", from Journal of New Materials for Electrochem. Systems, vol. 3, No. 4, Oct. 2000, pp. 275-284.

M. J. Gonzalez et al., Abstract from "Pt-Sn Microstructures as Catalysts for Alcohol Oxidation", from 208th ACS National Meeting, American Chemical Society, 1994, pp. 1317.

L. Fornarini et al., Abstract from "Photoelectrochemical Behaviour of n-type $CdIn_2Se_4$ Semiconductor Electrodes in Polysulphide Electrolytes", from Sol. Cell., vol. 11, No. 4, May 1984, pp. 389-400.

J. K. Park et al., Abstract from "In Situ Measurement of Surface Stress Evolution During Sputter Deposition of CoCrX/Cr(X=Pt,Ta) Thin Film and its Magnetic Properties", from Journal of Applied Physics, vol. 97, No. 10, May 15, 2005.

M. T. Hepworth, Abstract from "Molten Iron Oxysulfide as a Superior Sulfur Sorbent", from Technical Report No. DOE/PC/89778-T5, Jan. 1, 1991, 9 pages.

K. M. Brace et al., Abstract from "High Throughput Synthesis and Screening of PdCoAu Alloy Compositional Space for Oxygen Reduction", Conference Publication—The 6. Intl. Symposium on New Materials for Electrochemical Systems, Jul. 7, 2006, 1 page.

\* cited by examiner

POWER GENERATION METHOD USING A FUEL CELL HAVING A STABILIZED CATHODE CATALYST

CROSS-REFERENCE TO RELATED APPLICATION(S)

This application is a divisional of U.S. patent application Ser. No. 12/867,162, filed Aug. 11, 2010 and entitled "A Fuel Cell Having a Stabilized Cathode Catalyst".

BACKGROUND

The present disclosure relates to platinum nanoparticles. More particularly, the present disclosure relates to stabilized platinum nanoparticles used as a catalyst in a fuel cell.

Platinum nanoparticles are well known for use as an electrocatalyst, particularly in fuel cells used to produce electrical energy. For example, in a hydrogen fuel cell, a platinum catalyst is used to oxidize hydrogen gas into protons and electrons at the anode of the fuel cell. At the cathode of the fuel cell, the platinum catalyst triggers the oxygen reduction reaction (ORR), leading to formation of water. The ORR reaction takes place at high potential, which makes the platinum nanoparticles unstable on the cathode, resulting in a loss in electrochemical surface area of the nanoparticles. Due to potential cycling during fuel cell operation, the platinum nanoparticles may dissolve. The atoms at the corners and the edges of the nanoparticles have a higher surface energy and, as such, are more reactive than surface atoms on the terraces of the nanoparticles. The nanoparticles commonly include surface features or defects that form on the surface during synthesis of the nanoparticles. The atoms that form these surface defects, including steps and kinks, are also more reactive sites on the nanoparticle, compared to the surface atoms on the terraces. The more reactive atoms are more prone to dissolving and forming oxides, as compared to atoms having lower surface energy.

Although platinum is a preferred material for use as a catalyst in a fuel cell, platinum is expensive. Moreover, the instability of the platinum nanoparticles in the cathode environment results in a loss of surface area of the nanoparticles, and consequently a loss in fuel cell performance. This requires a larger amount of platinum catalyst to be used in the fuel cell, which increases cost. There is a need for a platinum nanoparticle that is more stable during operation as a cathode catalyst in a fuel cell.

SUMMARY

A method of generating electrical power includes flowing hydrogen across an anode, splitting the hydrogen into protons and electrons using a catalyst attached to the anode, directing the electrons to a circuit to produce electrical power, flowing oxygen across a cathode, splitting the oxygen molecules into oxygen atoms using a cathode catalyst, passing the protons through an electrolyte to the cathode, and combining the protons with oxygen to form water. The cathode catalyst includes a plurality of nanoparticles having terraces formed of platinum, and corner regions and edge regions formed of a second metal.

BRIEF DESCRIPTION OF THE DRAWINGS

It is noted that the drawings are not to scale.

DETAILED DESCRIPTION

A stabilized platinum nanoparticle is described herein which includes a second metal (for example, gold) located on select areas of an outer surface of the nanoparticle. A method of producing stabilized nanoparticles is also described below and includes replacing platinum atoms at edge and corner regions of the nanoparticles with atoms of the second metal. Platinum atoms that form surface defects on the nanoparticle, such as steps and kinks, may also be replaced with atoms of the second metal. Platinum nanoparticles are commonly used as a catalyst and the nanoparticle structure described herein results in a more stable catalyst. In an exemplary embodiment, the platinum nanoparticles may be used as a cathode catalyst for an oxygen reduction reaction (ORR) in a fuel cell.

Platinum nanoparticles may be produced using known synthesis methods, such as chemical reduction. The platinum nanoparticles may be prepared as colloidal particles, and the size and shape of the nanoparticles may be controlled based on the conditions during synthesis. In an exemplary embodiment in which the platinum nanoparticles are used as a catalyst, a suitable range for the diameter of the nanoparticles described herein is between approximately 0.5 and 100 nanometers (nm). In some embodiments, the diameter ranges between approximately 1 and 20 nm; in other embodiments, the diameter ranges between approximately 1 and 10 nm.

Figure 1:
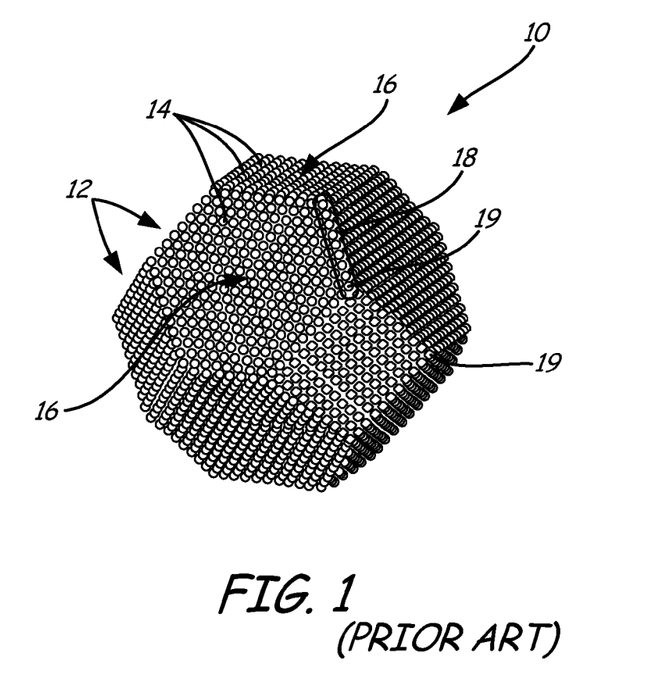
FIG. 1 is a schematic of a representative, existing platinum nanoparticle used, for example, as a catalyst, and having a plurality of terraces, corners and edges.

FIG. 1 is a schematic of representative, existing nanoparticle 10, which has a cubo-octahedron shape. Nanoparticle 10 includes a core or inside portion and outer surfaces 12. In an exemplary embodiment, surfaces 12 are formed from a plurality of platinum atoms 14 bonded together to create a plurality of flats or terraces 16, edges 18, and corners 19. Each edge 18 represents an intersection of two adjoining terraces 16, and each corner 19 is an intersection of at least three edges 18. In the embodiment shown in FIG. 1, corners 19 represent an intersection of three edges 18. Platinum atoms 14 that form terraces 16 are surface atoms. For purposes of this disclosure, in a Pt (100) facet or surface, a surface atom is defined as an atom having eight nearest neighbor atoms, since platinum has a face-centered cubic unit cell. Surface atoms have a lower surface energy than corner and edge atoms.

In the embodiment shown in FIG. 1, nanoparticle 10 has a regular cubo-octahedron shape, and terraces 16 are essentially flat and free of defects. It is recognized that nanoparticle 10 may commonly have a more irregular shape and terraces 16 may include surface features or defects, such as steps and kinks. These surface defects are described further below in reference to FIG. 5A.

Although not visible in FIG. 1, the core or inside portion of nanoparticle 10 may be formed of platinum or a platinum alloy. Other metals used to form the platinum alloy core may include transition metals from periods 4, 5, and 6 of the periodic table. Alternatively, essentially all of the core of nanoparticle 10 may be formed by at least one metal other than platinum. In the exemplary embodiment of FIG. 1, outer surfaces 12 are formed essentially of platinum atoms 14. Depending on a composition of the core or inside portion, the platinum atoms that form outer surfaces 12 may be formed from only one layer of platinum atoms. Alternatively, outer surfaces 12 may be formed from two or more layers of platinum atoms. In an alternative embodiment, all of nanoparticle 10, including outer surfaces 12, may be formed of a platinum alloy.

Figure 2:
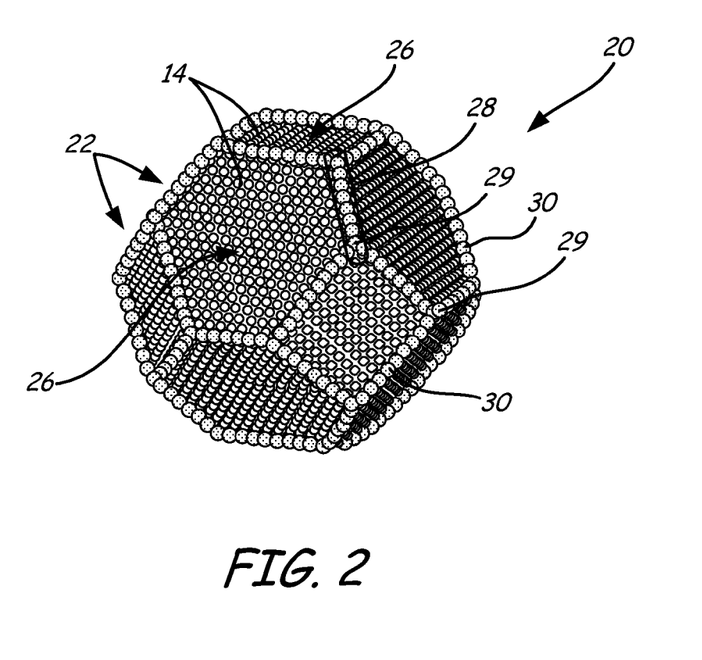
FIG. 2 is a schematic of a stabilized platinum nanoparticle having atoms from a second metal selectively located on edge and corner regions of the nanoparticle in place of platinum atoms from the edge and corner regions.

FIG. 2 is a schematic of stabilized nanoparticle 20, which also has a cubo-octahedron shape. The stabilized nanoparticles described herein may include nanoparticles of any known shape and other examples are shown in the figures and discussed below. Similar to nanoparticle 10, nanoparticle 20 has a core portion and outer surfaces 22, which include terraces 26, edges 28 and corners 29. Similar to nanoparticle 10, the core portion of nanoparticle 20 may be formed of platinum, a platinum alloy or at least one non-platinum metal. Terraces 26 are formed of platinum atoms 14, also similar to nanoparticle 10. In contrast to nanoparticle 10, edges 28 and corners 29 are formed of second metal atoms 30. In an exemplary embodiment, atoms 30 are gold atoms (Au). As shown in FIG. 2, gold atoms 30 are larger in size compared to platinum atoms 14; however, the size differential between gold and platinum atoms is exaggerated in FIG. 2. Nanoparticle 20 is approximately the same size as nanoparticle 10. Because a portion of nanoparticle 20 is formed of second metal 28, nanoparticle 20 uses less platinum compared to nanoparticle 10. This is beneficial since platinum is an expensive metal.

As shown in FIG. 2, nanoparticle 20, similar to nanoparticle 10 of FIG. 1, has a regular cubo-octahedral shape and is essentially free of defects. As such, terraces 26 are formed of essentially all surface atoms. It is more common that nanoparticle 20 would have surface defects and some irregularity in its shape. For example, as described below and shown in FIG. 5A, terraces 26 may have steps that make each terrace 26 an irregular surface.

Figure 3:
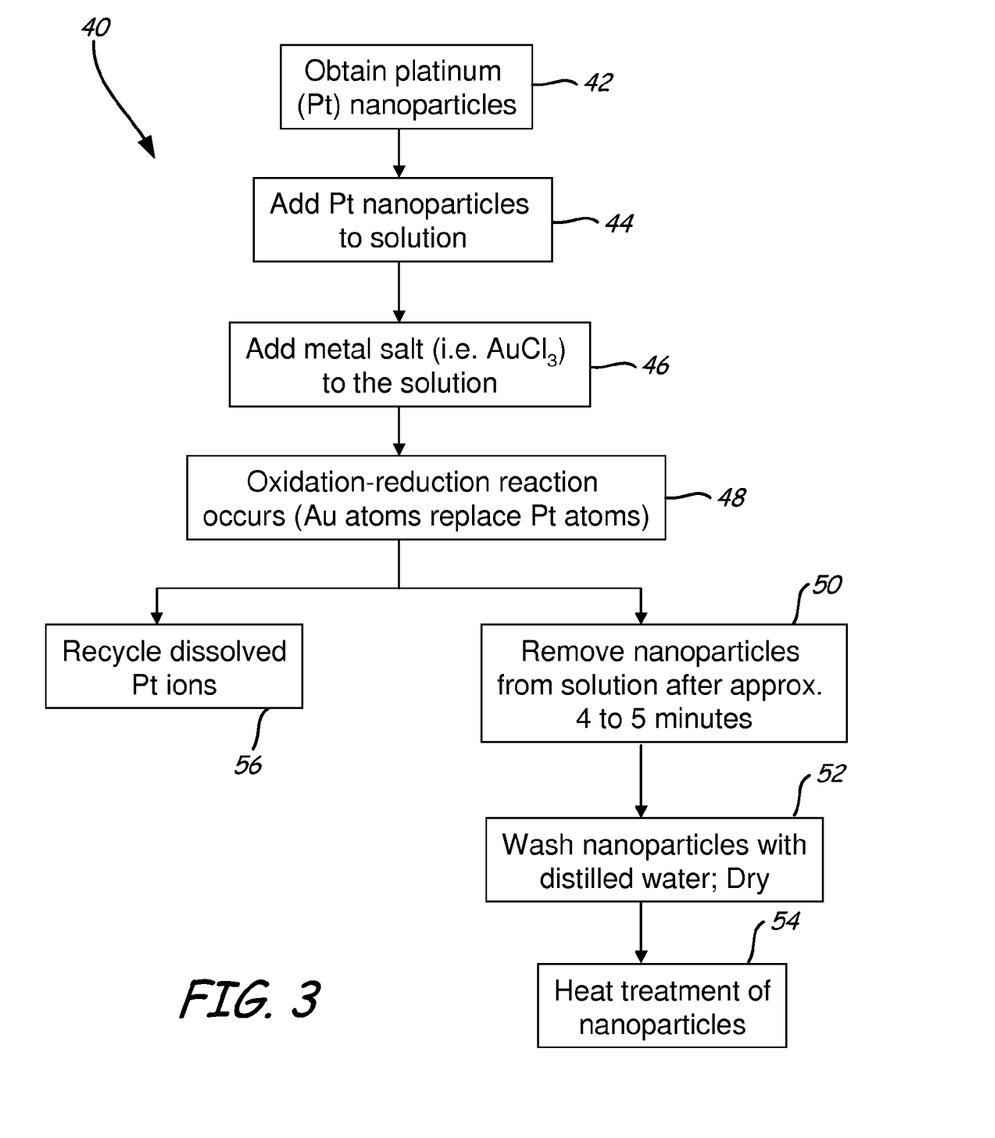
FIG. 3 is a block diagram illustrating a method of producing a stable platinum nanoparticle similar to the nanoparticle of FIG. 2.

FIG. 3 is a flow diagram illustrating method 40 for producing a stabilized platinum nanoparticle, similar to nanoparticle 20 of FIG. 2, by selectively removing platinum atoms from the edge and corner regions of the nanoparticle and replacing the removed platinum atoms with atoms from a second metal. In an exemplary embodiment, the second metal is gold (Au). Other metals may also be used in addition to gold, including, but not limited to, iridium, rhodium, ruthenium, rhenium, osmium, palladium, silver, and combinations thereof. Method 40 includes steps 42-56, and begins with obtaining platinum nanoparticles (step 42) similar to nanoparticle 10 of FIG. 1. The nanoparticles may be comprised essentially of platinum and platinum alloys, and may be of any known shape, as discussed further below. Step 42 of method 40 may include synthesis of the platinum nanoparticles using any known method. Alternatively, the obtainment of the nanoparticles in step 42 may involve purchasing the platinum nanoparticles.

A next step in method 40 is to add the platinum nanoparticles into a solution (step 44). In an exemplary embodiment, the solution is an acidic solution, including, but not limited to, sulfuric acid and perchloric acid. Other solutions may include, but are not limited to, an alkaline solution and a non-aqueous solution. An example of an alkaline solution is sodium hydroxide. An example of a non-aqueous solution is ethylene glycol. In one embodiment, the platinum nanoparticles may be supported on an electrically conductive substrate, such as, but not limited to, carbon black, a metal oxide, a metal carbide, boron doped diamond, and combinations thereof. In that case, the substrate carrying the platinum nanoparticles is added to the solution. In an alternative embodiment, the platinum nanoparticles are unsupported and instead dispersed in a solution, which is then added to the solution in step 44.

A metal salt, such as, for example gold trichloride ($AuCl_3$), is then added to the solution in step 46. It is recognized that steps 44 and 46 may occur in reverse order or occur simultaneously so long as the nanoparticles are combined with the metal salt. Placing the metal salt in the acidic solution forms a solution containing gold ions ($Au^{3+}$). Platinum atoms on a surface of the nanoparticles react with the gold ions in a standard oxidation reduction reaction (redox) (step 48):

$$Pt \rightarrow Pt^{2+} + 2e^- \qquad (1)$$

$$Au^{3+} + 3e^- \rightarrow Au \qquad (2)$$

As a result of the reaction in step 48, platinum atoms (Pt) are oxidized to form platinum ions ($Pt^{2+}$), which then dissolve into the solution. The gold ions ($Au^{3+}$) in the solution are reduced by the platinum to form gold atoms (Au), which may then replace the platinum atoms on the nanoparticles. The driving force for this reaction is a difference in electrode potential between gold and platinum in the solution. The standard electrode potential of gold is higher than the standard electrode potential of platinum. Platinum atoms at the corner and edge regions of the nanoparticles have a lower electrode potential than platinum surface atoms on the terraces or flats of the nanoparticles. Thus, the platinum atoms at the corner and edge regions have a much lower electrode potential relative to the gold ions in the solution. The large difference in electrode potential causes gold ions in the solution to be reduced by platinum atoms at the corner and edge regions of the nanoparticle. The platinum from the corner and edge regions is oxidized to form platinum ions. The electron transfer from the platinum atoms to the gold ions (to form gold atoms) occurs at the corner and edge regions, and thus the gold atoms replace the platinum atoms at the corners and edges of the nanoparticle. Due to a difference in valency, three platinum atoms reduce two gold ions, as shown by the equations below:

$$3Pt \rightarrow 3Pt^{2+} + 6e^- \quad (3)$$

$$2Au^{3+} + 6e^- \rightarrow 2Au \quad (4)$$

The reduction of the gold ions to gold atoms by platinum first occurs at the corner and edge regions of the nanoparticle due to the larger difference in electrode potential between the gold and the platinum atoms at the corners and edges. Over time, the gold atoms would also replace the platinum surface atoms on the terraces or flats of the nanoparticle. However, the rate of these reactions is slower due to a smaller difference in electrode potential between the gold in the solution and the platinum surface atoms on the terraces of the nanoparticle. As described below, the nanoparticles are only left in the solution for a certain period of time, in order to prevent replacement of the platinum surface atoms on the terraces of the nanoparticle.

When the platinum nanoparticles are mixed with the metal salt in solution, the reaction of platinum and gold in step 48 occurs due to a difference in electrode potentials. In some embodiments, step 48 may include stirring the solution to avoid the mass transport effect, and to promote the reaction between platinum and gold. Stirring may be performed, for example, by a magnetic stirrer. In some embodiments, the solution may also be heated, using, for example, a burner. The temperature of the heated solution may be between approximately 40 and 300 degrees Celsius.

In step 50, the platinum nanoparticles are removed from the solution after a time determined to be sufficient to replace the platinum atoms essentially only on the edge and corner regions 30 and 32 of nanoparticle 20, such that terraces 26 remain unchanged. In an exemplary embodiment, the platinum nanoparticles are removed approximately four to five minutes after adding the metal salt in step 46. It is recognized that this time may increase or decrease depending, in part, on the type of metal salt, the concentration of the metal salt, the temperature of the reaction, and the volume of nanoparticles. The relative reactivity of the platinum atoms at the edges and corners, as well as at any steps and/or kinks (i.e. surface defects), may also impact the reaction time to replace the platinum nanoparticles essentially only at the edges, corners and defects of the nanoparticle. For example, the relative reactivity of the platinum atoms at edges and corners may vary as a function, in part, of an overall shape of the nanoparticles.

In the embodiment in which the nanoparticles are dispersed in solution and unsupported, the nanoparticles are filtered in step 50 in order to remove the nanoparticles from the solution. Next, in step 52, the nanoparticles are washed with distilled water and then dried. In some embodiments, the nanoparticles may be dried in a vacuum.

An optional step in method 40 is to heat treat the nanoparticles (step 54) at approximately 200 to 500 degrees Celsius for approximately 0.5 to 2 hours. The heat treatment may also include nitrogen or hydrogen gas, or a mixture of the two. Because hydrogen is a reducing agent, exposing the platinum nanoparticles to hydrogen under heat may ensure that any gold ions on the nanoparticles that were not completely reduced to gold atoms in the solution, or gold atoms physically adsorbed on the platinum surface, may be reduced during the heat treatment. The gold atoms generally remain on the surface, rather than migrate into a bulk or core region of the nanoparticle, due to surface segregation of gold. During annealing, gold atoms may tend to move to the edge and corner regions of platinum particles, where they are more stable compared to at the terraces.

As described above, the gold atoms first replace the platinum atoms from the edge and corner regions of the platinum nanoparticle. So long as the nanoparticles are removed from the gold ions after a predetermined time, the surface atoms on the terraces of the nanoparticle, in general, remain unchanged. It is recognized, however, that some gold atoms may deposit onto the terraces during the period intended only for replacement of corner and edge regions. It is believed that heat treating the nanoparticles in step 54 may cause any gold atoms on the terraces to diffuse to the edge and corner regions.

Platinum from the corners and edges of the nanoparticle is oxidized by the gold ions to form platinum ions, which are dissolved into the solution. In step 56 of method 40, the dissolved platinum ions may be recycled to synthesize additional platinum nanoparticles. Alternatively, the platinum ions may be recycled for other uses.

In some embodiments, method 40 may include an optional step (not shown in FIG. 3) of blocking the terraces of the nanoparticle using a surfactant. In that case, the surfactant is adsorbed onto the terrace surfaces. This optional step may be performed prior to mixing the platinum nanoparticles with the second metal (step 44). Because the surfactant covers the platinum atoms on the terraces of the nanoparticle, the surfactant prevents gold atoms from replacing platinum atoms on the terraces of the nanoparticle. One example of a surfactant that may be used is polyvinylpyrrolidone (PVP).

Method 40 of FIG. 3 is an electroless deposition process that is based on a standard oxidation reduction reaction (redox). As described above, gold and other metals, such as iridium, rhodium, ruthenium, rhenium, osmium, palladium and silver, may replace platinum atoms at the corners and edges, as well as at any surface defects, to form a stabilized platinum nanoparticle using method 40. Other methods may be used to produce a stabilized platinum nanoparticle having a second metal on these reactive regions of the nanoparticle.

The selected method may depend, in part, on the particular metal being used to form the stabilized platinum nanoparticle. Other metals in addition to those disclosed above may also be used to form a stabilized platinum nanoparticle by protecting the platinum nanoparticle at edges and corners, as well as at any surface defects. These additional metals include transition metals from groups four through six of the fourth, fifth and sixth row of the periodic table. The metals which may be included in these alternative methods include, but are not limited to, titanium, zirconium, hafnium, vanadium, niobium, tantalum, chromium, molybdenum, and tungsten. These metals may act as strong oxide formers once deposited onto the platinum nanoparticle. Methods for forming the stabilized nanoparticle using these additional metals include, but are not limited to, deposition of the transition metals from a complex in a solution or a vapor phase, electrodeposition of the transition metal from a solution, chemical reduction by a strong reducing agent, and vapor deposition of ions of the transition metal. These additional methods result in a stabilized platinum nanoparticle having a second metal that is a strong oxide former. In these additional methods, the formation of the second metal at the edge and corner regions, as well as at any surface defects, may occur, in part, through migration or segregation.

Additional steps may be taken to enhance the stabilization of the nanoparticle by the transition metal. These additional processing steps may include, but are not limited to, an annealing treatment at elevated temperatures and a conditioning treatment in a strong oxidizing atmosphere. Moreover, the terraces of the nanoparticle may be temporarily capped with protective ligands, such as sulfate or phosphate groups. This is similar to an optional step described above, under method 40, of blocking the terraces using a surfactant.

Figures 4A, 4B, 4C, 4D:
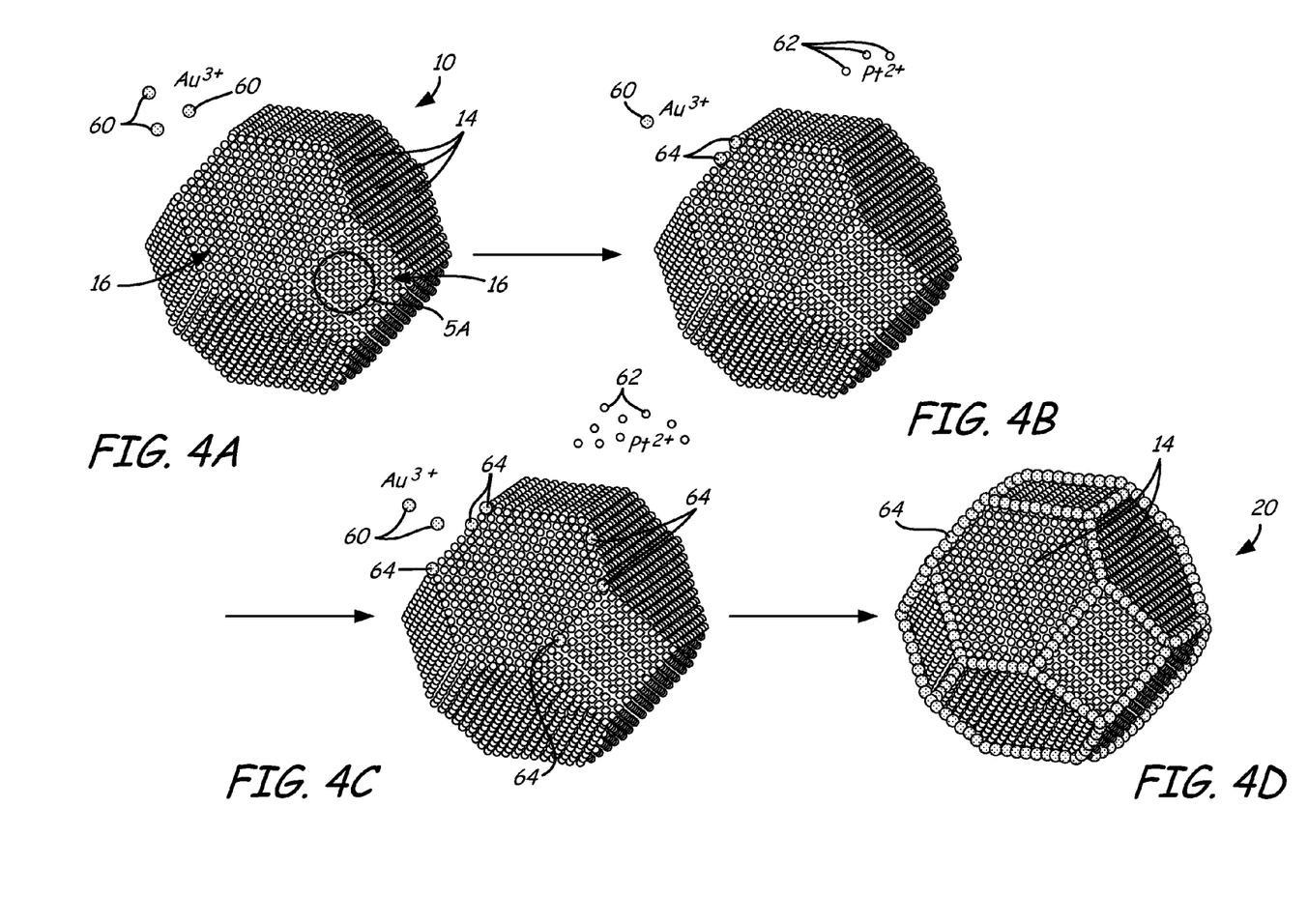
FIGS. 4A-4D are schematics illustrating the method of FIG. 3 for selectively replacing the platinum atoms from the edge and corner regions of the nanoparticle with a second metal.

FIGS. 4A-4D are schematics showing nanoparticle 10 of FIG. 1 undergoing method 40 to form nanoparticle 20 of FIG. 2. FIG. 4A shows nanoparticle 10, which is initially formed only of platinum atoms 14, exposed to gold ions 60 ($Au^{3+}$). As shown in FIG. 4B, three platinum atoms have been oxidized by gold to form three platinum ions 62 ($Pt^{2+}$) which are then dissolved into the solution. Two gold ions ($Au^{3+}$) are reduced by the three platinum atoms to form two gold atoms 64, which replace the platinum atoms on nanoparticle 10. FIG. 4C shows nanoparticle 10 after platinum and gold have been together in solution for a longer period of time and additional gold atoms 64 are shown bonded to the corner and edge regions of nanoparticle 10. It is recognized that the replacement process of gold for platinum may be somewhat random in terms of an order in which the platinum atoms are replaced. In some cases, a platinum atom on a terrace may be replaced before replacement of all the corners and edges; however, in general, the replacement first occurs on the corner and edge regions of the nanoparticle. Due to the difference in valency, two gold atoms replace three platinum atoms. Because gold is a larger atom compared to platinum, a single gold atom occupies more of the corner and edge region compared to a single platinum atom.

FIG. 4D is a schematic of nanoparticle 10 after essentially all the corner and edge regions have been replaced by gold atoms 64; thus, nanoparticle 10 is converted to nanoparticle 20. It is recognized that nanoparticle 20 may have a slightly irregular shape due to a difference in the total number of atoms before and after method 40, as well as a difference in size between platinum atoms and gold atoms. Moreover, it is recognized that a minimal amount of gold atoms may attach to the flats of nanoparticle 20. However, so long as nanoparticle 20 is removed from the solution at a predetermined time, in general, the flats of nanoparticle 20 should remain unchanged.

In an exemplary embodiment, the metal that replaces the platinum at the edge and corner regions of the nanoparticles is gold (Au). Although platinum is a noble metal, in operation as a catalyst in a fuel cell, platinum atoms on the platinum nanoparticle are unstable and may be oxidized. This causes the platinum atoms to dissolve from the nanoparticle, resulting in an unstable platinum catalyst. Gold is well suited for this application because it is a more noble metal compared to platinum and is less likely to be oxidized during cycling of the fuel cell. By coating the edges and corners of the nanoparticle with gold, the gold does not dissolve during operation of the fuel cell and the catalyst remains stable over time. Moreover, as described further below, if only the corner and edge regions of the nanoparticle are replaced with gold, the impact on the ORR activity of the platinum catalyst is negligible.

Another advantage of using gold in this application is that gold has an overall higher standard electrode potential than platinum. As described above, the driving force of an oxidation reduction reaction is a difference in electrode potential between the oxidant (gold ions) and the reductant (platinum atoms). Comparing two similarly located atoms in which one is gold and one is platinum, gold has a higher standard electrode potential than platinum. However, when the platinum atom is located at an edge or a corner region of a nanoparticle, that platinum atom has a higher surface energy and a consequently lower electrode potential compared to a platinum atom on a terrace of the nanoparticle. As such, the difference in electrode potential between the gold and the platinum atom at the corner or the edge is even greater. As described above, this difference in electrode potential is why the gold atoms replace the platinum atoms first at the corner and edge regions of the nanoparticle. Although the platinum atoms on the flats of the nanoparticle may still have an electrode potential lower than gold, the difference in electrode potential is smaller. Therefore, the reaction generally does not occur for the platinum atoms on the flats until the more reactive atoms (i.e. at the corners and edges) are replaced.

The goal of method 40 is to replace the platinum atoms with a second metal only at the edge and corner regions of the nanoparticle. Other metals, in addition to gold, may also be used, including, but not limited to, iridium, rhodium, ruthenium, rhenium, osmium, palladium, silver, and combinations thereof. It is not required that the standard electrode potential of the second metal is greater than the overall standard electrode potential of platinum, but rather that the electrode potential of the metal ions in solution is greater than the electrode potential of the platinum at the corner and edge regions of the nanoparticles. As such, in some embodiments, the second metal may have a standard electrode potential that is about equal to or even less than the standard electrode potential of platinum.

As described above, other methods in addition to method 40 may be used to form a stabilized platinum nanoparticle. These alternative methods may use other metals, such as transition metals that act as strong oxide formers on the nanoparticle.

As shown in FIG. 4D, gold atoms 64 form the edge and corner regions of nanoparticle 20. In the embodiment shown in FIG. 4D, nanoparticle 20 is large enough such that the majority of the total surface area of nanoparticle 20 is still formed by platinum atoms 14. For smaller sized nanoparticles, which are formed of less platinum atoms, the gold atoms that form the edge and corner regions occupy a greater portion of the total surface area of the nanoparticle. As mentioned above, in some embodiments, a suitable range of the diameter of the platinum nanoparticles is between approximately 1 and 20 nm; in other embodiments, the diameter ranges between approximately 1 and 10 nm. For smaller-sized nanoparticles (i.e. less than 1.5 nm), the gold atoms (or other second metal) occupy more of the surface area of the nanoparticle. As such, the gold (or other second metal) may occupy up to approximately seventy-five percent of the total surface area of the nanoparticle. On the other hand, nanoparticles up to or greater than 10 nanometers may also be used, and thus the gold may occupy as little as approximately five percent of the total surface area. Therefore, once the second metal atoms replace the platinum atoms on the surface, the second metal atoms may occupy between approximately five and approximately seventy-five percent of a total surface area of the nanoparticle.

The nanoparticles described herein use less platinum compared to nanoparticle 10 of FIG. 1 because the gold atoms replace platinum atoms on the nanoparticles. The replaced platinum may then be recycled. Gold (or another second metal) selectively replaces platinum at the corners and edges, as well as at any surface defects, based on the difference in electrode potential. Because the gold atoms only cover the corners and edges, and any surface defects, the nanoparticles maintain their catalytic activity, but are more durable during potential cycling.

Figure 5A:
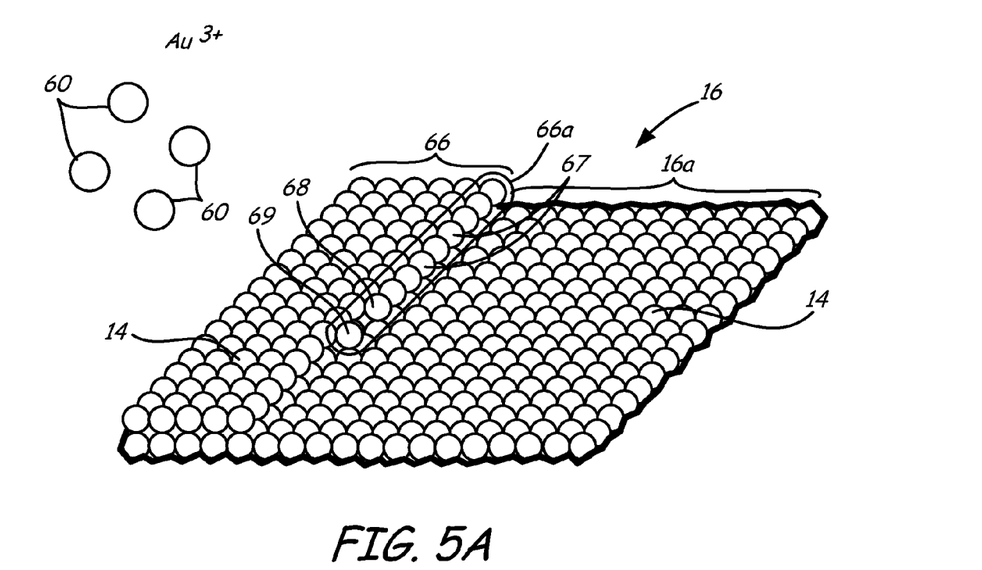
FIG. 5A is a schematic of an enlarged portion of one of the Pt (100) terraces of the nanoparticle of FIG. 4A to illustrate surface defects, including step atoms and kink atoms, that may exist on the nanoparticle.
Figure 5B:
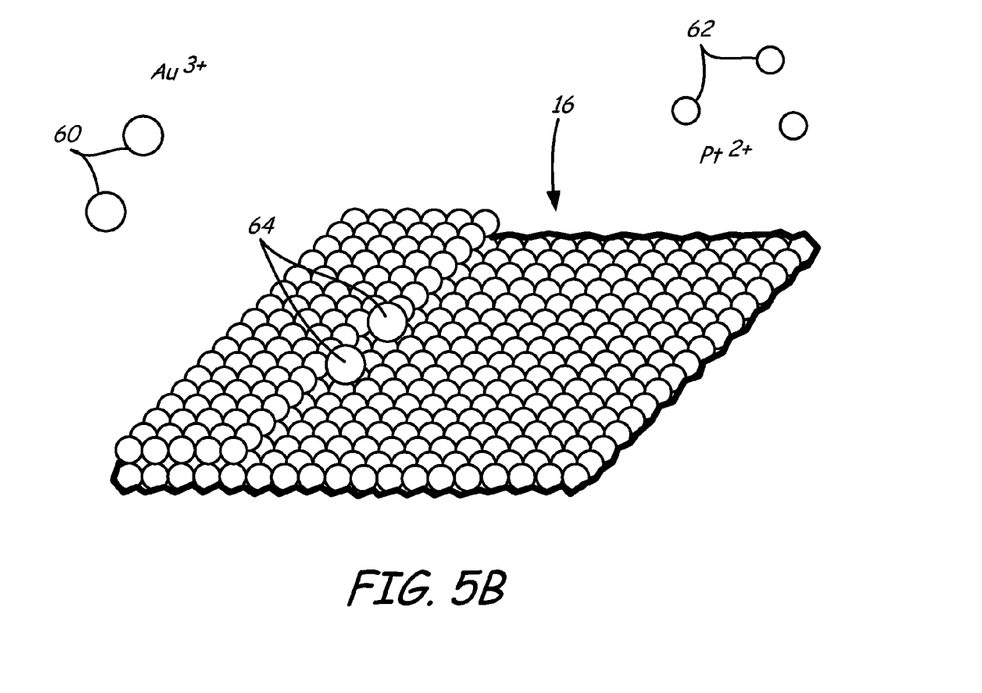
FIG. 5B is a schematic of the Pt (100) terrace from FIG. 5A after two platinum step atoms and a platinum kink atom have been replaced by two gold atoms.

The nanoparticles shown thus far have had regular cubo-octahedron shapes and have been essentially free of defects. As such, the terraces of the nanoparticles have been shown as flat surfaces comprised essentially of all surface atoms. As stated above, in reality, the nanoparticles described herein commonly have surface defects that form as a result of the synthesis process used in forming the nanoparticles. FIG. 5A is a schematic of an enlarged portion of one of terraces 16 from nanoparticle 10 of FIG. 4A to illustrate these surface defects. Terrace 16 of FIG. 5A is a (100) surface, and thus is referred to as Pt (100) terrace 16. FIGS. 5A and 5B illustrate that, if these surface defects are present on a nanoparticle, gold atoms may likely replace some of the platinum atoms at the surface defects. This occurs because the platinum atoms that form the surface defects are more reactive sites on the nanoparticle, similar to edge and corner atoms. (Note that the surface defects shown in FIG. 5A are not visible in FIG. 4A.)

As shown in FIG. 5A, Pt (100) terrace 16 is formed of all platinum atoms 14 and includes stable portion 16a and ledge 66. Ledge 66 is a layer of platinum atoms 14 that forms over part of stable portion 16a, resulting in an elevated layer of atoms 14. Similar to atoms 14 on stable portion 16a, the majority of atoms 14 on ledge 16 are surface atoms. Because platinum has a face-centered cubic unit cell, a surface atom on a (100) surface has eight nearest neighbor atoms. The stability of each atom is a function, in part, of how many other atoms are surrounding that atom. Like the surface atoms in stable portion 16a, most atoms on ledge 16 have eight nearest neighbor atoms. However, platinum atoms 14 located in a last row of ledge 66 (labeled as 66a) are more reactive because these atoms have no more than seven nearest neighbor atoms. More specifically, last row 66a includes step atoms 67, kink atom 68 and step adatom 69. Step atoms 67 are defined as atoms having seven nearest neighbor atoms. Kink atom 68 has six nearest neighbor atoms, including a step atom 67. Finally, step adatom 69 has only four nearest neighbor atoms. It is recognized that the nearest neighbor atoms for surface atoms, step atoms, kink atoms and step adatoms may vary based on the crystallographic orientation of the facet surface.

FIG. 5A shows gold ions 60 ($Au^{3+}$) near terrace 16. As described above, gold ions 60 react with platinum atoms 14 in an oxygen reduction reaction, and as a result, gold atoms may replace platinum atoms on the nanoparticle. This reaction is driven by a difference in electrode potential between the platinum atoms on the nanoparticle and the gold ions in solution. The difference in electrode potential between atoms 67, 68, 69 and gold ions 60 in solution is much greater than the difference between platinum surface atoms and gold ions 60. Thus, atoms 67, 68 and 69, like the corner and edge atoms, react with gold ions 60 quicker than platinum surface atoms on stable portion 16a.

FIG. 5B shows Pt (100) terrace 16 after two of gold ions 60 ($Au^{3+}$) have reacted with three platinum atoms 14 to form two gold atoms 64 on the nanoparticle, and three platinum ions 62 ($Pt^{2+}$) dissolve into solution. As shown in FIG. 5B, gold atoms 64 replaced step adatom 69, kink atom 68 and one step atom 67. Step adatom 69 and kink atom 68 are replaced by gold atoms 64 quicker than other platinum atoms on ledge 66 due to a higher level of reactivity and a lower electrode potential, relative to gold. It is recognized that multiple ledges and steps may be present on terrace 16, including multiple ledges on top of one another. The nanoparticles described herein may vary in terms of an amount of surface defects present on the nanoparticles.

As described above, the platinum nanoparticles are removed from the metal salt solution after a time sufficient such that the terraces, which are the less-reactive regions of the nanoparticles, remain unchanged. More specifically, the platinum surface atoms on the terraces do not react with the second metal due to a smaller difference in electrode potential. By contrast, the atoms that form the steps and kinks on the terraces may likely be replaced with the second metal atoms, because these atoms are more reactive than surface atoms on the terraces. Unless a nanoparticle has an unusually large number of surface defects, the majority of the terraces should remain unchanged so long as the nanoparticles are removed from the solution after a time determined sufficient to only replace the platinum atoms at the reactive sites on the nanoparticle. Depending on an amount of surface defects, the second metal atoms may occupy a greater percentage of the surface area of the nanoparticle than the ranges provided above, which were based on the edge and corner regions of the nanoparticle.

Figure 6A:
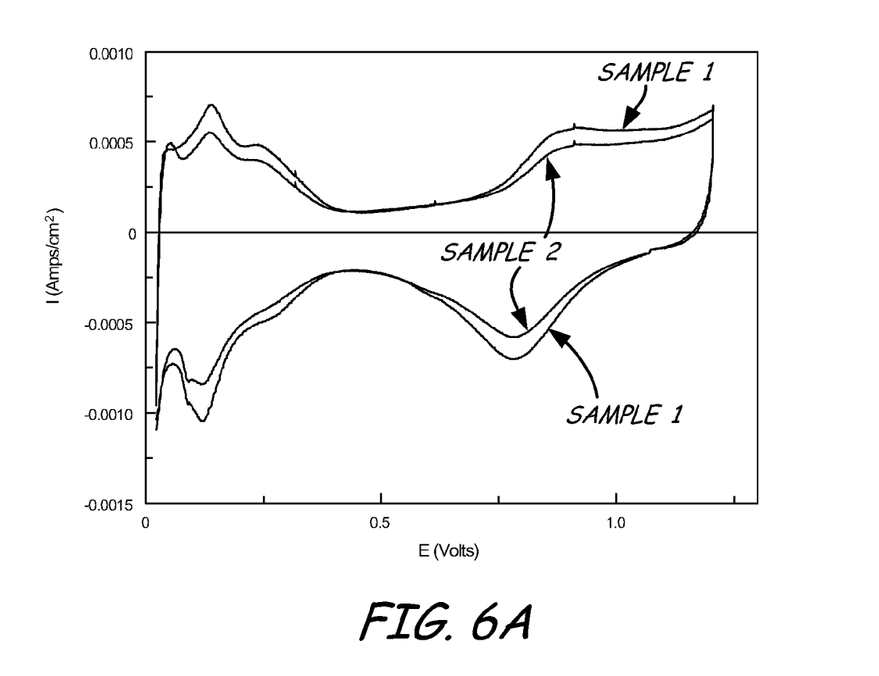
FIG. 6A is a plot of voltammetry curves comparing standard platinum nanoparticles to platinum nanoparticles exposed to a metal salt in an acid solution for five minutes, in order to compare the electrochemical active area of the nanoparticles before and after the reaction.

FIG. 6A is a plot of a cyclic voltammetry curve comparing existing platinum nanoparticles (like nanoparticle 10 of FIG. 1 and designated as sample 1 in FIG. 6A) to a stabilized platinum nanoparticle described herein (like nanoparticle 20 of FIG. 2 and designated as Sample 2 in FIG. 6A). The nanoparticles of sample 2 were kept in solution with a metal salt ($AuCl_3$) for approximately five minutes. In both samples 1 and 2, the nanoparticles were generally cubo-octahedral shaped nanoparticles having a diameter of approximately five nanometers. It is recognized that samples 1 and 2 may include nanoparticles having other shapes in addition to cubo-octahedral nanoparticles. The other shapes may include, for example, generally spherical or quasi-spherical nanoparticles and other irregular shapes. The nanoparticles in samples 1 and 2 may also have surface defects which may contribute to an irregular shape of the nanoparticles.

The electrochemical active area (ECA) of a platinum catalyst is calculated based on the hydrogen adsorption charge. Comparing the values for hydrogen adsorption between samples 1 and 2, the ECA of the nanoparticles of sample 2 decreased by approximately 18 percent compared to the ECA for the nanoparticles of sample 1. This suggests that approximately 18 percent of a surface area of the nanoparticles in sample 2 was replaced by gold. For a cubo-octahedral shaped nanoparticle having a diameter of approximately five nanometers, the corner and edge atoms account for approximately 18 percent of the total surface atoms. Thus, the plot in FIG. 6A supports a conclusion that, after approximately five minutes in the solution containing the metal salt, the atoms at the corner and edge regions of the nanoparticles are replaced with atoms from the second metal, while the terraces of the nanoparticles remain generally unchanged.

Figure 6B:
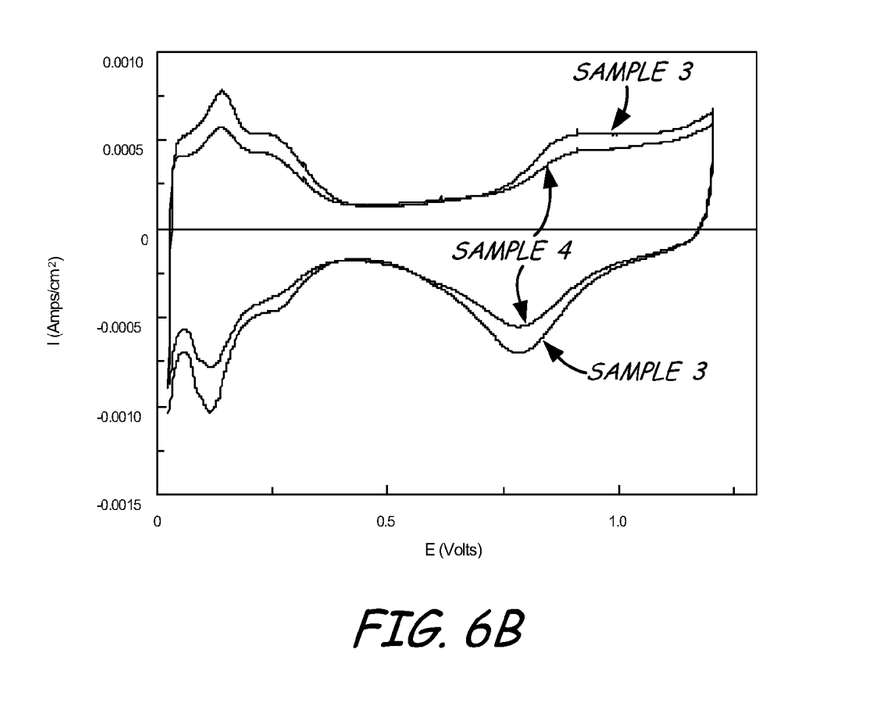
FIG. 6B is a plot similar to FIG. 6A comparing standard platinum nanoparticles to platinum nanoparticles exposed to a metal salt in solution for twenty minutes.

FIG. 6B is a voltammetry curve similar to FIG. 6A for samples 3 and 4. Sample 3, similar to sample 1, includes standard platinum nanoparticles that are generally cubo-octahedral shaped and have a diameter of approximately 5 nanometers. Sample 4 is similar to sample 2 of FIG. 6A, but the nanoparticles of sample 4 were kept in the solution with the metal salt for approximately 20 minutes. As stated above in reference to samples 1 and 2, the nanoparticles in samples 3 and 4, although generally cubo-octahedral shaped, may include other shaped nanoparticles and nanoparticles having surface defects.

Comparing the values for hydrogen adsorption between samples 3 and 4, the ECA of the nanoparticles of sample 4 decreased by approximately 22 percent compared to the ECA for the nanoparticles of sample 3. These results indicate that after a longer period of time the gold atoms from the metal salt begin to also replace platinum atoms from the terraces of the nanoparticle. The displacement of the platinum atoms from the terraces is slower because these atoms are less reactive, due to a smaller difference in potential between the metal ions in the solution and the platinum atoms on the terraces or flats of the nanoparticle. The results from FIGS. 6A and 6B show that replacing the platinum atoms essentially only on the corner and edge regions of the nanoparticles may be controlled by controlling the amount of time that the nanoparticles are in contact with the second metal solution.

Figure 7A:
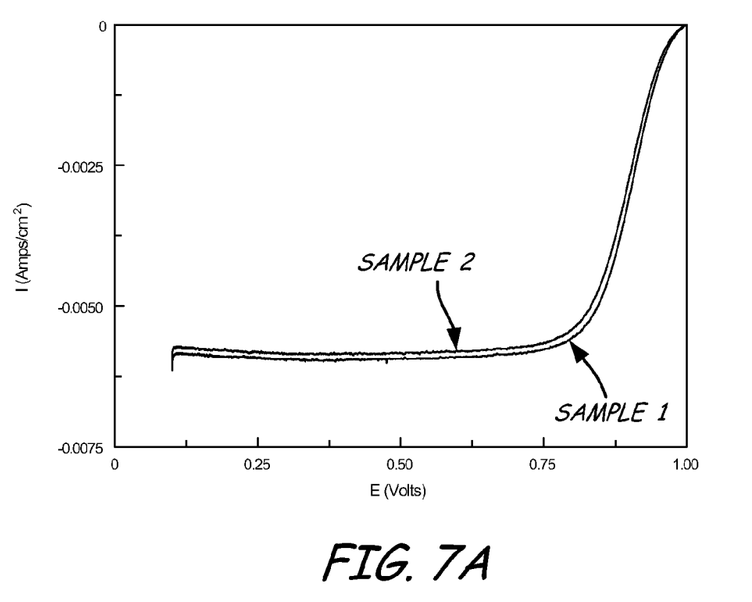
FIG. 7A is a plot of polarization for the two samples from FIG. 6A in order to determine the oxygen reduction reaction (ORR) activity level for each of the samples.

FIG. 7A is a plot of polarization for samples 1 and 2 from FIG. 6A, and compares the oxygen reduction reaction (ORR) activity for the two samples. At a voltage equal to 0.9 V, as shown in FIG. 7A, the current density for sample 2 is 5.82 mA cm$^{-2}$, whereas the current density for sample 1 is 5.97 mA cm$^{-2}$. The mass activity (not shown in FIG. 7A) at 0.9 V is 0.22 A mg$^{-1}_{Pt}$ for sample 1 and 0.20 A mg$^{-1}_{Pt}$ for sample 2. The reduction in current density and mass activity for sample 2, as compared to sample 1, is due to a loss in the total amount of platinum on the nanoparticles of sample 2, thus reducing the catalytic activity of the nanoparticles. However, the loss of ORR activity in sample 2, relative to sample 1, is negligible. On the other hand, the specific activity of the nanoparticles in sample 2 is calculated to be 0.54 mA cm$^{-2}$, compared to a value of 0.51 mA cm$^{-2}$ for the sample 1 nanoparticles. The specific activity is the kinetic current density normalized to the ECA. The increase in specific activity for sample 2, compared to sample 1, is reasonable since the platinum atoms at the corners and edges of the nanoparticle are typically less active for the ORR, compared to the atoms on the flats of the nanoparticle.

Figure 7B:
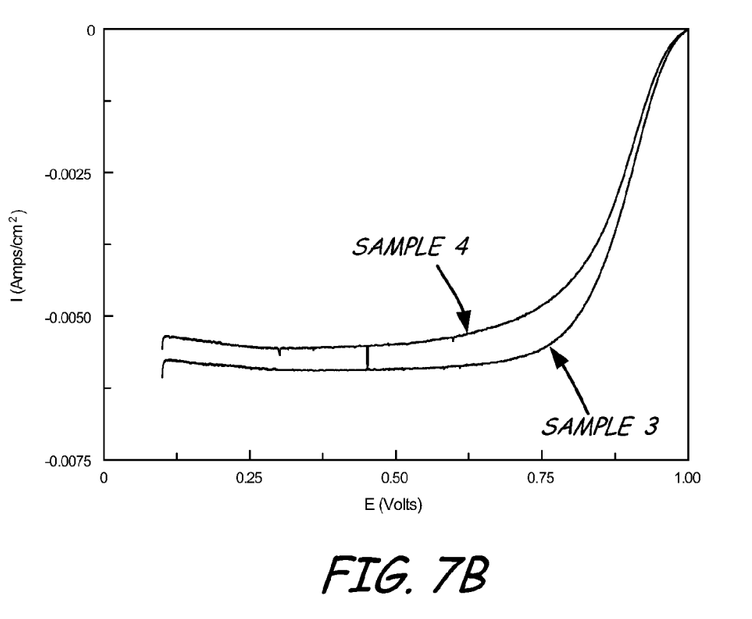
FIG. 7B is a plot similar to FIG. 7A for the two samples from FIG. 6B.

FIG. 7B is a plot of polarization similar to FIG. 7A comparing samples 3 and 4. The nanoparticles of sample 4 were left in the metal salt solution for approximately 20 minutes. As shown by FIG. 7B, the difference in ORR activity between samples 3 and 4 is greater than the difference between samples 1 and 2 of FIG. 7A, especially in the higher overpotential region (i.e. below approximately 0.9 V). The current density of sample 4 is 5.61 mA cm$^{-1}$, compared to a value of 5.97 mA cm$^{-1}$ in sample 3. The results of FIG. 6B indicate that between approximately 5 minutes and 20 minutes in the metal salt solution, the platinum atoms on the terraces of the nanoparticles begin to be replaced by gold atoms. FIG. 7B illustrates that even if a small portion of the platinum atoms from the flats are replaced with gold atoms, the ORR activity decreases significantly, and the nanoparticles of sample 4 are less effective as an electrocatalyst, compared to those of sample 2.

Figure 8:
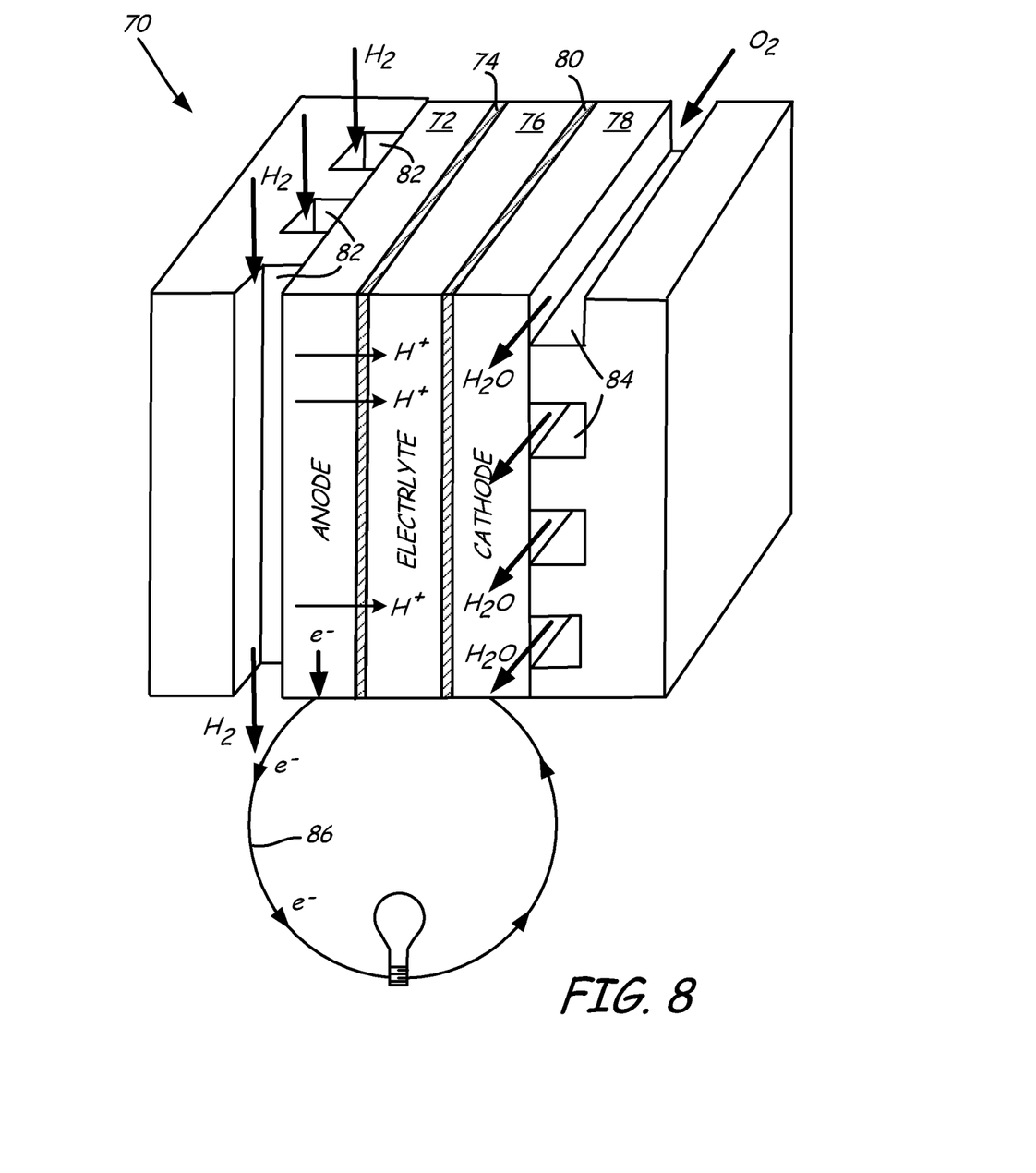
FIG. 8 is a schematic of a fuel cell that uses the platinum nanoparticles described herein as a stabilized cathode catalyst.

Platinum nanoparticles are commonly used as an electrocatalyst in an electrochemical cell, and the stabilized platinum nanoparticles described herein may result in a more active catalyst. FIG. 8 is an exemplary embodiment of fuel cell 70, which includes the platinum nanoparticles described herein as a stabilized cathode catalyst layer.

Fuel cell 70 is designed for generating electrical energy and includes anode 72, anode catalyst layer 74, electrolyte 76, cathode 78, and cathode catalyst layer 80. Anode 72 includes flow field 82 and cathode 78 includes flow field 84. In an exemplary embodiment, fuel cell 70 is a hydrogen cell using hydrogen as fuel and oxygen as oxidant. It is recognized that other types of fuels and oxidants may be used in fuel cell 70.

Anode 72 receives hydrogen gas (H$_2$) by way of flow field 82. Catalyst layer 74, which may be a platinum catalyst, causes the hydrogen molecules to split into protons (H$^+$) and electrons (e$^-$). Electrolyte 76 allows the protons to pass through to cathode 78, but the electrons are forced to travel to external circuit 86, resulting in a production of electrical power. Air or pure oxygen (O$_2$) is supplied to cathode 78 through flow field 84. At cathode catalyst layer 80, oxygen molecules react with the protons from anode 72 to form water (H$_2$O), which then exits fuel cell 70, along with excess heat.

Anode catalyst layer 74 and cathode catalyst layer 80 may each be formed from platinum nanoparticles. As described above, cathode catalyst layer 80 is used to increase the rate of the oxygen reduction reaction (ORR) causing the formation of water from protons and oxygen. Even though platinum is a catalytic material, the platinum is unstable in this environment. During potential cycling, platinum atoms from the platinum nanoparticles dissolve, particularly starting from corner and edge regions of the nanoparticles. The platinum nanoparticle described herein and shown in FIGS. 2 and 4D is a more stable nanoparticle and is more durable for use as cathode catalyst layer 80. It is recognized that the nanoparticle of the present invention may also be used for anode catalyst layer 74. However, the platinum is more stable in the environment used for anode catalyst layer 74, and the problems described above for cathode catalyst layer 80 do not generally apply to layer 74.

In one embodiment, fuel cell 70 is a polymer electrolyte membrane (PEM) fuel cell, in which case electrolyte 76 is a proton exchange membrane formed from a solid polymer. In an alternative embodiment, fuel cell 70 is a phosphoric acid fuel cell, and electrolyte 76 is liquid phosphoric acid, which is typically held within a ceramic matrix. Cubo-octahedral shaped nanoparticles, like nanoparticle 10 of FIG. 1, are commonly used in fuel cells, including PEM and phosphoric acid fuel cells. Other nanoparticle shapes that have been studied for use as platinum catalysts include, but are not limited to, cubic and tetrahedral nanoparticles. Specific shaped nanoparticles may be more stable in a specific type of electrolyte.

It is recognized that a platinum catalyst may use nanoparticles having a variety of shapes and it is not required that a particular shape be used with a particular fuel cell. However, the ORR activity may be influenced, in part, by a combination of the type of electrolyte and the shape of the nanoparticles. This may be due to a difference in the crystal faces that form the shapes of the nanoparticles. Cubic nanoparticles are formed essentially of all (100) surfaces, whereas tetrahedral nanoparticles are formed of (111) surfaces.

Figure 9A:
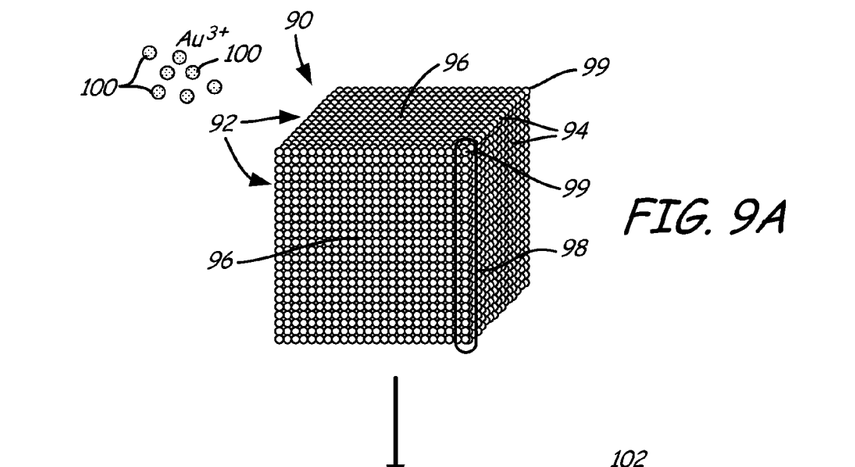
FIGS. 9A-9C are schematics of a cubic-shaped nanoparticle, also suitable for use as a catalyst, as it undergoes the process of having the platinum atoms at the edge and corner regions replaced with atoms from a second metal.
Figure 9B:
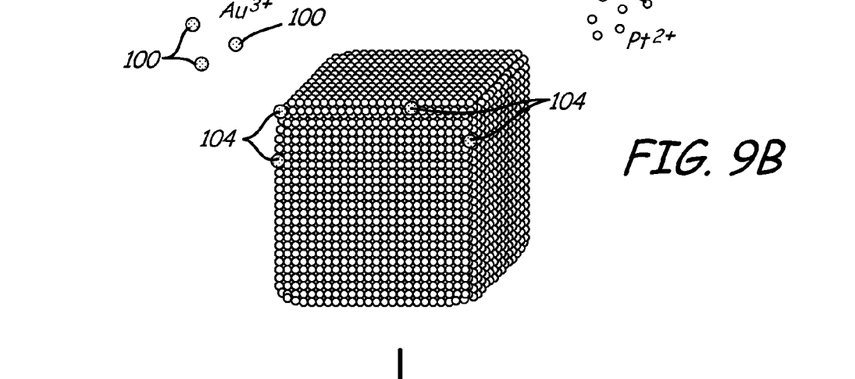
Figure 9C:
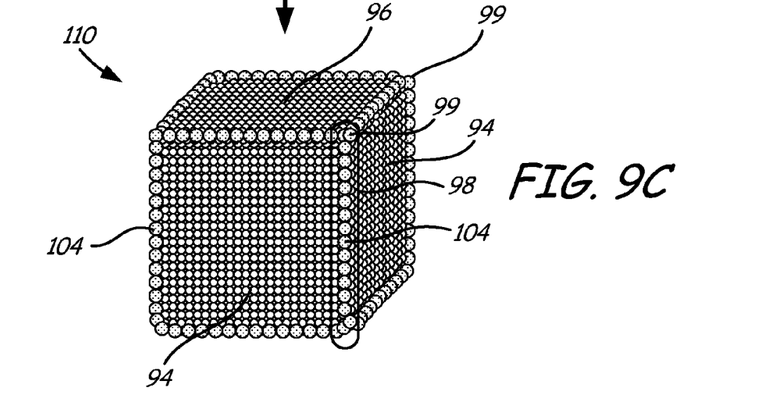

In some embodiments, the cathode catalyst for a phosphoric acid fuel cell is formed of cubic-shaped platinum nanoparticles having corner and edge regions formed of a second metal (see FIG. 9C). If the cubic nanoparticles include a second metal, such as gold, the cathode catalyst is more stable, and thus should have a longer operational life since a total mass of the cathode catalyst should remain relatively constant. On the other hand, in a PEM fuel cell, the cathode catalyst, in some embodiments, is formed of tetrahedral-shaped platinum nanoparticles having corner and edge regions formed of a second metal (see FIG. 10C). By using a tetrahedral-shaped nanoparticle coated with gold at the corners and edges, the ORR activity of the nanoparticles in the PEM fuel cell may be further increased. It is recognized that, in either a PEM or a phosphoric acid fuel cell, the catalyst may also include nanoparticles of at least one other shape.

FIG. 9A is a schematic of nanoparticle 90, which is similar to nanoparticle 10 of FIG. 1, but is cubic-shaped. Nanoparticle 90 has a core formed of platinum, a platinum alloy, or at least one other transition metal. Outer surfaces 92 of nanoparticle 90 are formed of platinum atoms 94, similar to nanoparticle 10. Surfaces 92 are formed of flats or terraces 96, edges 98 and corners 99. Nanoparticle 90, as shown in FIG. 9A, has a regular cubic shape, and terraces 96 are generally free of defects. However, as described above, it is recognized that nanoparticle 90 may commonly have surface defects or features that result in nanoparticle 90 having an irregular shape and terraces 96 having uneven surfaces. FIGS. 9A-9C illustrate nanoparticle 90 as it undergoes method 40 of FIG. 3 in order to replace platinum atoms 94 at edges 98 and corners 99 with atoms from a second metal.

Nanoparticle 90 of FIG. 9A is combined with a metal salt (for example, $AuCl_3$) in a solution, as described above, resulting in the formation of gold ions 100 ($Au^{3+}$). As described above, a difference in electrode potential between platinum atoms 94 on nanoparticle 90 and gold ions 100 in solution drives the redox reaction. Platinum atoms from edges 98 and corners 99 of nanoparticle 90 dissolve to form platinum ions 102 ($Pt^{2+}$). Gold ions 100 are reduced to form gold atoms 104, which replace platinum atoms on nanoparticle 90. The atoms from edges 98 and corners 99 are oxidized before terrace atoms due to a lower electrode potential of atoms 94 at edges 98 and corners 99. FIG. 9B shows nanoparticle 90 after platinum atoms have dissolved edges 98 and corners 99, and gold atoms 104 have begun to replace the platinum atoms, resulting in an irregular shape for nanoparticle 90.

In FIG. 9C, gold atoms 104 have attached to nanoparticle 90 to form stabilized cubic nanoparticle 110. Although gold atoms are shown in this exemplary embodiment, other metals in addition to gold may be used as the second metal. As described above in reference to FIG. 2, gold atoms are larger in size than platinum atoms, although the difference in size is further exaggerated in FIGS. 9B and 9C. An overall size of nanoparticle 110 remains unchanged compared to nanoparticle 90, particularly since three platinum atoms are dissolved for every two gold atoms deposited onto nanoparticle 110. It is recognized that nanoparticle 110 may have an irregular shape compared to nanoparticle 90; however, nanoparticle 110 remains generally cubic-shaped. Although not shown in FIG. 9C, it is recognized that nanoparticle 110 may commonly include surface defects, such as steps and kinks, on terraces 96. The platinum atoms that form the steps and kinks are reactive, similar to edge and corner atoms. As such, the platinum atoms at the steps and kinks may also be replaced with gold atoms.

Figure 10A:
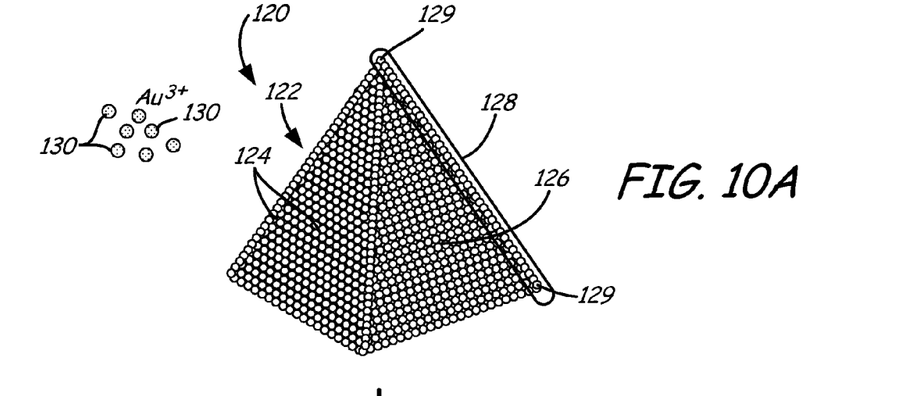
FIGS. 10A-10C are similar to FIGS. 9A-9C and illustrate a tetrahedron-shaped nanoparticle undergoing the method for replacing the platinum atoms at the edge and corner regions of the nanoparticle.
Figure 10B:
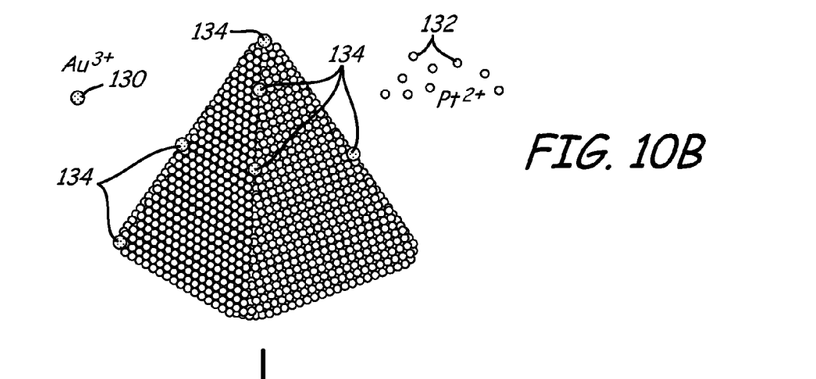
Figure 10C:
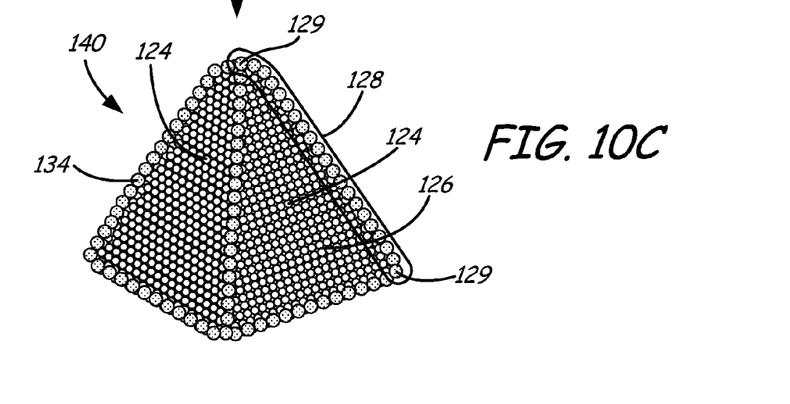

FIG. 10A is a schematic of nanoparticle 120, similar to nanoparticles 10 and 90, but having a tetrahedron shape. Nanoparticle 120 is formed of a core portion and outer surfaces 122 formed of platinum atoms 124 and including terraces 126, edges 128 and corners 129. As stated above in reference to cubic-shaped nanoparticle 90, it is recognized that nanoparticle 120, in reality, may have a more irregular tetrahedron-based shaped, and that surface defects (i.e. steps and kinks) may commonly be present on terraces 126. FIGS. 10A-10C are similar to FIGS. 9A-9C and illustrate the process of forming a stabilized tetrahedral shaped nanoparticle.

When nanoparticle 120 is combined with gold trichloride in solution, gold ions 130 ($Au^{3+}$) form, as shown in FIG. 10A. Due to a difference in electrode potential, platinum atoms 124 from nanoparticle 120 transfer electrons to reduce gold ions 130 to gold atoms 134, which replace platinum atoms 124 on nanoparticle 120. The oxidized platinum ions 132 ($Pt^{2+}$) are then dissolved into the solution. Because platinum atoms 124 at edges 128 and corners 129 are more reactive than platinum atoms 124 at terraces 126, gold atoms 134 attach first to the edges and corners of nanoparticle 120.

FIG. 10C shows stabilized nanoparticle 140 after gold atoms 134 have replaced essentially all of platinum atoms 124 at edge and corner regions 128 and 129. Nanoparticle 140 has an irregular shape due to a difference in size between platinum atoms 124 and gold atoms 134, as well as a difference between the number of platinum atoms removed and the number of second metal atoms deposited on nanoparticle 140. Since nanoparticle 120 of FIG. 9A normally would have surface defects on terraces 126, it is recognized that nanoparticle 140 would also include gold atoms on terraces 126 that had replaced any platinum step atoms and kink atoms that had formed the surface defects of nanoparticle 120.

The present disclosure of forming a more stable platinum nanoparticle applies to all nanoparticles, regardless of shape. Although specific shapes (i.e. cubo-octahedral, cubic and tetrahedral) are described above and illustrated in the figures, it is recognized that nanoparticles having additional shapes are within the scope of the present disclosure. Other nanoparticle shapes include, but are not limited to, icosahedral, rhombohedral, and other types of polyhedrons. Additional nanoparticle shapes include cylindrical, spherical, and quasi-spherical, which do not have well-defined edge and corner regions. The atoms that form the defects, steps and kinks on these nanoparticles are believed to have similar reactivity to edge and corner atoms, and these atoms may consequently be replaced by the second metal.

Although the stabilized platinum nanoparticles of the present disclosure are described in the context of use as a catalyst in a fuel cell, the nanoparticles may also be used in other types of electrochemical cells, including but not limited to, batteries and electrolysis cells. The nanoparticles may also be used in other applications that would benefit from platinum nanoparticles have a more stable structure, including other catalyst applications, as well as non-catalyst applications.

Although the present invention has been described with reference to preferred embodiments, workers skilled in the art will recognize that changes may be made in form and detail without departing from the spirit and scope of the invention.

The invention claimed is:

1. A method of generating electrical power, the method comprising:
    flowing hydrogen across an anode;
    splitting the hydrogen into protons and electrons using an anode catalyst attached to the anode;
    directing the electrons to a circuit to produce electrical power;
    flowing oxygen molecules across a cathode;
    splitting the oxygen molecules into oxygen atoms using a cathode catalyst the cathode catalyst including a plurality of nanoparticles having terraces formed of platinum, and corner regions and edge regions formed of a second metal;
    passing the protons through an electrolyte to the cathode; and
    combining the protons with the oxygen atoms to form water.

2. The method of claim 1, wherein the electrolyte is phosphoric acid and the nanoparticles of the catalyst cathode have a cubic shape.

3. The method of claim 1, wherein the electrolyte is a polymer exchange membrane and the nanoparticles of the catalyst cathode have a tetrahedral shape.

4. The method of claim 1, wherein the nanoparticles of the catalyst cathode include at least one of cubo-octahedral nanoparticles, cubic nanoparticles, tetrahedral nanoparticles, icosahedral nanoparticles, spherical nanoparticles, quasi-spherical nanoparticles, rhombohedral nanoparticles, and truncated octahedral nanoparticles.

5. The method of claim 1, wherein the second metal used to form the nanoparticles of the catalyst cathode includes at least one of gold, iridium, rhodium, ruthenium, rhenium, osmium, palladium, and silver.

6. The method of claim 1, wherein the nanoparticles of the cathode catalyst have a diameter ranging between approximately 0.5 and approximately 100 nanometers.

7. The method of claim 1, wherein the terraces include at least one surface defect formed of the second metal.

8. The method of claim 7, wherein the surface defects include at least one of a step atom, a kink atom, and a step adatom.

9. A method, comprising:
   generating electrical power, the generating including:
   moving hydrogen across an anode;
   moving oxygen molecules across a cathode;
   splitting the hydrogen into protons and electrons with an anode catalyst;
   splitting the oxygen molecules into oxygen atoms using a cathode catalyst, the cathode catalyst including a plurality of nanoparticles, each nanoparticle having platinum terraces, corner regions of a second metal, and edge regions of the second metal;
   moving the protons through an electrolyte to the cathode;
   outputting electrical power by moving the electrons to a circuit; and
   outputting water by combining the protons with the oxygen atoms.

10. The method of claim 9 wherein moving the hydrogen across the anode includes moving the hydrogen through a plurality of flow fields adjacent to the anode.

11. The method of claim 10 wherein moving the hydrogen through the plurality of flow fields includes flowing the hydrogen in a first direction and moving the oxygen molecules across the cathode includes flowing the oxygen molecules in a second direction that is orthogonal to the first direction.

12. A method, comprising:
   generating electrical power using a stabilized cathode catalyst, the cathode catalyst including a plurality of nanoparticles, each nanoparticle having platinum terraces, corner regions of a second metal, and edge regions of the second metal, the generating electrical power including:
   flowing hydrogen across an anode;
   flowing oxygen molecules across a cathode;
   splitting the hydrogen into protons and electrons with an anode catalyst;
   splitting the oxygen molecules into oxygen atoms with the cathode catalyst; and
   outputting the electrical power by moving the electrons to a circuit.

13. The method of claim 12 wherein the generating of the electrical power includes moving the protons through an electrolyte to the cathode.

14. The method of claim 12 wherein the generating of the electrical power includes outputting water by combining the protons with the oxygen atoms.

15. The method of claim 12 wherein flowing the hydrogen across the anode includes moving the hydrogen through a plurality of flow fields adjacent to the anode.

16. The method of claim 15 wherein moving the hydrogen through the plurality of flow fields includes flowing the hydrogen in a first direction and flowing the oxygen molecules across the cathode includes flowing the oxygen molecules in a second direction that is orthogonal to the first direction.

17. The method of claim 12 wherein the second metal is one from among gold, iridium, rhodium, ruthenium, rhenium, osmium, palladium, and silver.

\* \* \* \* \*